July 7, 1942.　　　　C. LUCKHAUPT　　　　2,288,634
METHOD OF TREATING POROUS MATERIALS
Filed July 28, 1939
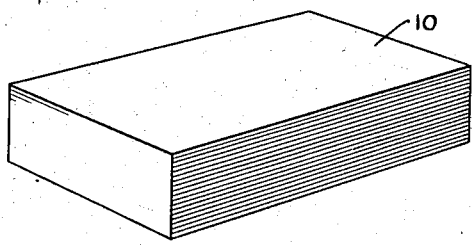
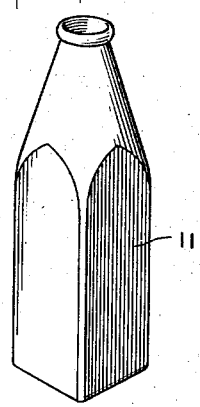
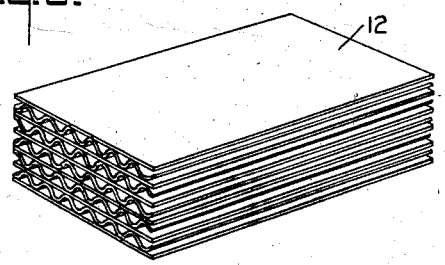
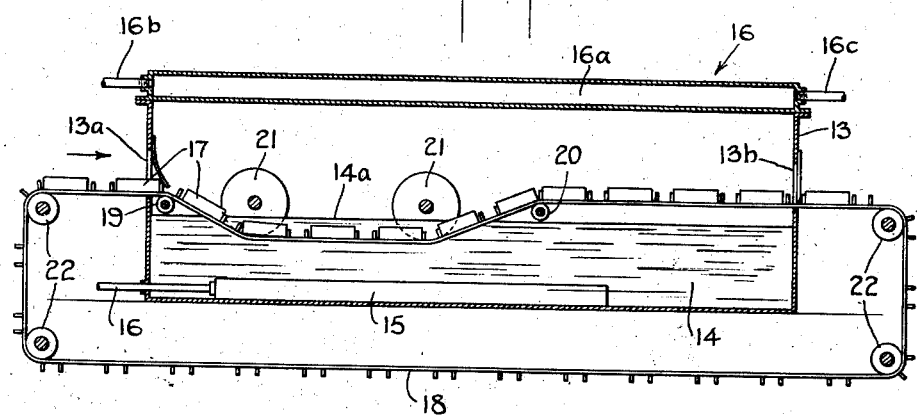
INVENTOR
Christopher Luckhaupt
BY Henry J. Lucke
HIS ATTORNEY Patented July 7, 1942

2,288,634

UNITED STATES PATENT OFFICE 2,288,634

METHOD OF TREATING POROUS MATERIALS

Christopher Luckhaupt, Jamaica, N. Y., assignor to L-K-L Processes, Inc., a corporation of New York Application July 28, 1939, Serial No. 287,018

1 Claim. (Cl. 91—70)

My present invention relates to the treatment of porous materials, and the resulting composition.

The present application is a continuation in part of my co-pending application Serial No. 113,463, filed November 30, 1936, now Patent No. 2,173,882, and entitled Method of treating porous materials and resulting product.

A general characteristic of my present invention, similar to the invention of my stated application Serial #113,463, is the treatment of the treated material with terpin hydrate at or above its melting temperature of 115° C., either by immersion in a bath of the melted material or in a vapor thereof at or above 115° C., rendering the treated material enhanced in hardness and correlated attributes, viz., increased tensile strength, increased flexual strength, increased compressional strength, etc.

More specifically, my present invention relates to the treatment of porous material, such as cellulosic material, which are insoluble in the treating material at treatment temperature, with fortifiers in conjunction with terpin hydrate for rendering in addition to enhanced hardness, as above set out, proofness against water, attack by vermin, and imparting electrical insulation and dielectric qualities, resiliency or elasticity.

Certain of the stated fortifiers have the additional efficacy of imparting fire resistency.

The major number of the stated fortifiers are of oleaginous character having the quality, in conjunction with terpin hydrate, to impart the generic qualities of water proofness, repelling vermin, electrical insulation and dielectric qualities, resiliency or elasticity as well as polish, and also improving tensile, flexual and compressional strengths. This group of fortifiers includes aluminum stearate, calcium stearate, natural and synthetic waxes, such as montan wax, carnauba wax, ceresin wax, etc., oils such as castor oil, soya bean oil, etc., the aforesaid generically of oleaginous character.

Further features and objects of the invention will be more fully understood from the following detail description and the accompanying drawing, in which—

Fig. 1 is a perspective view, in diagrammatic form, illustrating cellulose matter treated pursuant to my process, the product represented in this figure being typical of so treated natural cellulose matter such as wood or other vegetable matter, pulp formed therefrom, etc.;

Fig. 2 is an elevational view, in diagrammatic form illustrating a hollow object of cellulose constituency treated according to my process, the indicated bottle being typical of various forms of bottomless as well as bottomed objects, the latter serving as a bottle or other container;

Fig. 3 is a perspective view, in diagrammatic form, illustrating a product formed pursuant to my process, the illustration being typical of fabricated products, such as corrugated board and the like, and Fig. 4 is a diagrammatic view, in elevation, indicating certain essential steps in carrying out the immersion method of my invention.

As a fortifier for enhanced water-proofness, I cite aluminum subacetate, aluminum stearate, calcium stearate and the like. Such fortifier may be added, as a powder, to the melted terpin hydrate. For such treatment, such fortifier, singly or plurally, may be of the proportion by weight of two percent (2%) and upwards, fifty percent (50%) by weight of such fortifier or fortifiers being the usual maximum content by weight.

Fortifiers for effecting high electrical insulation may be employed conjointly with my stated treatment material, rendering the resulting product acceptable under the fire underwriters' requirements as commercial electrical insulation. For such purpose, a fortifier such as lead stearate, alone or with a natural or synthetic wax, may be added to the melted terpin hydrate.

Montan wax, carnauba wax, when employed as fortifiers with terpin hydrate, effect electrical insulating qualities to wood and other natural vegetable matter, wood pulp and other cellulose matter, natural, artificial and fabricated.

As typical formulae employing lead stearate as such fortifier, the proportion of lead stearate by weight is from two percent (2%) upwardly. When a natural or synthetic wax is employed in combination with lead stearate, the respective proportions of lead stearate content and wax content are from two percent (2%) upwardly, the terpin hydrate content usually varying from ninety-two percent (92%) downwardly. In the attainment of electrical insulation, resiliency or elasticity is imparted to the resulting electrical insulation material or dielectric by the addition of para gum, castor oil, each of which may be added as a fortifier in proportion from two percent (2%) upwardly.

If desired, waxes and the like may be added to the melted terpin hydrate, such as carnauba wax, ceresin wax, etc., in proportion by weight from two percent (2%) upwardly, to impart a permanent source of polish or gloss, and function to control by proportional quantity the degree of pliability.

Color, as desired, may be imparted to the treated article, by adding suitable color, such as anilin, vegetable, mineral and other dyes, pigments, etc. to the melted terpin hydrate. Color, viz, anilin, vegetable, mineral or other dyes, pigments, etc. are added in proportional content correspondingly with respect to the depth of color tone desired. Typical admixture of color as a fortifier with terpin hydrate ranges from one to thirty-two proportional part of color to thirteen hundred parts of terpin hydrate, by weight.

Sheets, board, corrugated board, bags, cups and the like, or present commercial and other approved individual products of paper and other cellulose constituency, when treated pursuant to my invention, are transformed into strong and rigid objects, possessing optionally any of the stated additional attributes. Tubes, rods and the like of original paper or wood pulp or other cellulose constituency are transformed into material suitable for commercial uses comparable in strength, weight supporting qualities, resistance against crushing, etc. to like attributes of natural wood, metal and the like.

Figure 1 illustrates at 10 a generally solid article typical of substitute lumber, board, tile, bloc, or other unit for wall, floor, ceiling, etc., of buildings, vehicles, such as automobiles, airplanes, toy vehicles, etc., steamboats, lifeboats, canoes, rowboats, and other navigation vessels, etc., treated pursuant to my invention as elsewhere more specifically set forth.

Figure 2 illustrates at 11 at object, specifically shown as a bottle, but typical generally of hollow objects whether provided with a bottom or not, with variant outer and inner configurations, treated pursuant to my invention as elsewhere herein more specifically set forth.

Figure 3 illustrates at 12 an object specifically of mechanically cellular structure but typical generally of fabricated non-solid constituency, treated pursuant to my invention as elsewhere herein more specifically set forth.

Figure 4 diagrammatically indicates an approved type of tank 13 for containing a bath 14 of the treatment material, constituted as more specifically set forth elsewhere herein, which bath may be maintained at the desired elevated temperature by means of a heating element at or above the melting point of terpin hydrate, to wit, 115° C. shown diagrammatically at 15, advantageously of electrical type, the electrical wiring being indicated at 16. Such tank is substantially wholly closed to the outer atmosphere, as by a cover, canopy or other form of closure indicated at 16, suitable means of entry as at 13a and of exit as at 13b for the objects to be treated, as for instance, by continuous operation upon a series of objects indicated at 17 to be immersed into and conveyed through such bath 14, as by means of an endless chain 18 of conventional or other approved type, suitable mutually spaced breaker rolls being indicated at 19, 20, within such tank 13 to effect the lowered travel of such endless chain 18 to fully immerse such objects 17 below the level 14a of such bath 14; such complete immersion may be positively had by the employment of the supplemental rolls indicated at 21, 21. Breaker rolls at suitable locations 22 exteriorly of the tank 13 for the desired travel of the endless chain 18 and the propulsion of the same.

Excelsior, i. e., shredded natural wood, synthetic wood fiber in shredded or comminuted form, straw or other dried vegetable matter, grass, reeds and like natural or synthetic cellulose matter, may be treated for heat insulation, pursuant to my process, with proper fortifying ingredient, as herein set out.

Products such as linoleum may be formed pursuant to my invention, preferably with a fortifier admixed with terpin hydrate, for attaining enhanced resistance against water, as well as attaining hardened surface condition, namely, by treatment of paper stock, pursuant to my process, and employing the above stated fortifiers. In the instance of the product being of uniform color, such color may be added to the treatment material. In the instance of the product bearing ornamentation, either of varigated outline and/or color, such ornamentation is applied to the surface of the paper stock in advance of treatment pursuant to my invention.

Whereas I have described my invention by reference to specific forms thereof, it will be understood that many changes and modifications may be made without departing from the spirit of the invention.

I claim:

The method of imparting enhanced hardness, and enhanced resistance relative to liquids and electrical conduction, to cellulose matter which is insoluble in terpin hydrate at treatment temperature, which comprises treating such cellulose matter with terpin hydrate admixed with an oleaginous material of the group consisting of aluminum stearate, lead stearate, montan wax, carnauba wax, castor oil, soya bean oil, at a temperature at or above 150° C., the range of proportion of such oleaginous material varying from approximately 2% to approximately 50% by weight of the terpin hydrate.

CHRISTOPHER LUCKHAUPT.

CERTIFICATE OF CORRECTION.

Patent No. 2,288,634.  July 7, 1942.

CHRISTOPHER LUCKHAUPT.

It is hereby certified that error appears in the printed specification of the above numbered patent requiring correction as follows: Page 2, second column, line 53, for "150° C." read --115° C.--; and that the said Letters Patent should be read with this correction therein that the same may conform to the record of the case in the Patent Office.

Signed and sealed this 22nd day of May, A. D. 1945.

Leslie Frazer (Seal) Acting Commissioner of Patents.